US012616250B2

(12) United States Patent
Kwon et al.

(10) Patent No.: US 12,616,250 B2
(45) Date of Patent: May 5, 2026

(54) AEROSOL-GENERATING ARTICLE AND AEROSOL GENERATION DEVICE USED THEREWITH

(71) Applicant: KT&G CORPORATION, Daejeon (KR)

(72) Inventors: Chan Min Kwon, Daejeon (KR); Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 364 days.

(21) Appl. No.: 18/037,176

(22) PCT Filed: Apr. 21, 2022

(86) PCT No.: PCT/KR2022/005747
§ 371 (c)(1),
(2) Date: May 16, 2023

(87) PCT Pub. No.: WO2022/270737
PCT Pub. Date: Dec. 29, 2022

(65) Prior Publication Data

US 2024/0016218 A1 Jan. 18, 2024

(30) Foreign Application Priority Data

Jun. 21, 2021 (KR) ........................ 10-2021-0079979

(51) Int. Cl.
*A24F 40/465* (2020.01)
*A24D 1/20* (2020.01)
(Continued)

(52) U.S. Cl.
CPC .............. *A24F 40/465* (2020.01); *A24D 1/20* (2020.01); *A24F 40/20* (2020.01); *H05B 6/105* (2013.01)

(58) Field of Classification Search
None
See application file for complete search history.

(56) References Cited

U.S. PATENT DOCUMENTS 1,794,227 A * 2/1931 Gearon .................. A24D 1/045 131/344
3,018,878 A * 1/1962 Watkins ............... B65D 85/109 206/268
(Continued)

FOREIGN PATENT DOCUMENTS

CN 108158029 A 6/2018
CN 108779609 A 11/2018
(Continued)

OTHER PUBLICATIONS

English machine translation of KR2018111460(A) published Oct. 11, 2018 to Han et al.; 25 pages. (Year: 2018).*
(Continued)

*Primary Examiner* — Linda L Gray
(74) *Attorney, Agent, or Firm* — Sughrue Mion, PLLC

(57) ABSTRACT

An aerosol-generating article and an aerosol generation device used therewith are provided. The aerosol generation device according to some embodiments of the present disclosure may include a housing configured to form an accommodation space in which an aerosol-generating article is accommodated and a heater part configured to heat the aerosol-generating article accommodated in the accommodation space, wherein the aerosol-generating article may include a tobacco rod, which includes a cavity segment filled with tobacco granules, and a filter rod. By the heater part having a structure that heats only the cavity segment or heats the tobacco rod from the inside and outside simultaneously, the tobacco granules filled in the cavity segment can be effectively heated.

12 Claims, 12 Drawing Sheets

(51) Int. Cl.

| | |
|---|---|
| ***A24F 40/20*** | (2020.01) |
| ***H05B 6/10*** | (2006.01) |

(56) References Cited

U.S. PATENT DOCUMENTS

| | | | |
|---|---|---|---|
| 10,130,121 | B2 | 11/2018 | Plojoux et al. |
| 2005/0194013 | A1 | 9/2005 | Wright |
| 2012/0037172 | A1 | 2/2012 | Allen et al. |
| 2019/0387787 | A1 | 12/2019 | Hejazi |
| 2020/0229487 | A1 | 7/2020 | Cao et al. |
| 2021/0051993 | A1 | 2/2021 | Kim et al. |

FOREIGN PATENT DOCUMENTS

| | | | | | |
|---|---|---|---|---|---|
| CN | 110475488 | A | | 11/2019 | |
| CN | 209694045 | U | | 11/2019 | |
| CN | 111741688 | A | | 10/2020 | |
| CN | 211703521 | U | | 10/2020 | |
| CN | 112739228 | A | | 4/2021 | |
| EP | 2 932 860 | A1 | | 10/2015 | |
| JP | 2007-533314 | A | | 11/2007 | |
| JP | 2015-506170 | A | | 3/2015 | |
| JP | 2019-500008 | A | | 1/2019 | |
| JP | 2020-520678 | A | | 7/2020 | |
| KR | 10-2013-0064052 | A | | 6/2013 | |
| KR | 10-2019-0049135 | A | | 5/2019 | |
| KR | 10-1994578 | B1 | | 6/2019 | |
| KR | 10-2021-0017522 | A | | 2/2021 | |
| KR | 10-2021-0043285 | A | | 4/2021 | |
| KR | 10-2246245 | B1 | | 4/2021 | |
| KR | 10-2021-0063964 | A | | 6/2021 | |
| WO | WO-2017178394 | A1 | * | 10/2017 | ............ A24F 42/60 |
| WO | 2020/194688 | A1 | | 10/2020 | |
| WO | 2020/261540 | A1 | | 12/2020 | |
| WO | 2021/033637 | A1 | | 2/2021 | |
| WO | 2021/085532 | A1 | | 5/2021 | |
| WO | 2021/107536 | A2 | | 6/2021 | |
| WO | 2021/215496 | A1 | | 10/2021 | |

OTHER PUBLICATIONS

English machine translation of TWI711743B to Yang et al. published Dec. 1, 2020; 67 pages. (Year: 2020).*

Korean Office Action for KR 10-2021-0079979 dated Apr. 6, 2023.

International Search Report for PCT/KR2022/005747 dated Aug. 3, 2022.

Communication dated Sep. 10, 2024 in Japanese application No. 2023-524631.

Extended European Search Report issued May 14, 2024 in European Application No. 22828586.2.

Office Action issued May 28, 2024 in Japanese Application No. 2023-524631.

Communication issued Dec. 23, 2025 in Chinese Patent Application No. 202280007502.X.

* cited by examiner

AEROSOL-GENERATING ARTICLE AND AEROSOL GENERATION DEVICE USED THEREWITH

CROSS REFERENCE TO RELATED APPLICATIONS

This application is a National Stage of International Application No. PCT/KR2022/005747 filed Apr. 21, 2022, claiming priority based on Korean Patent Application No. 10-2021-0079979 filed Jun. 21, 2021.

TECHNICAL FIELD

The present disclosure relates to an aerosol-generating article and an aerosol generation device used therewith, and more particularly, to a tobacco granule-based aerosol-generating article and an aerosol generation device used with the article.

BACKGROUND ART

In recent years, demand for alternative articles that overcome the disadvantages of traditional cigarettes has increased. For example, demand for devices that electrically heat a cigarette stick to generate an aerosol (e.g., cigarette-type electronic cigarettes) has increased. Accordingly, active research has been carried out on electric heating-type aerosol generation devices and cigarette sticks (or aerosol-generating articles) applied thereto.

Meanwhile, reconstituted tobacco leaves are mostly used as a tobacco material of the cigarette sticks, and shredded tobacco leaves are also used occasionally. Recently, using a tobacco material in a granular form has been proposed. For example, mounting a cartridge containing tobacco granules on an aerosol generation device to perform smoking has been proposed.

However, cartridge-type products have disadvantages in that they are less familiar to consumers than cigarette sticks, are not able to provide the same smoking sensation as cigarette sticks, and cause an increase in manufacturing costs.

DISCLOSURE

Technical Problem

Some embodiments of the present disclosure are directed to providing an aerosol-generating article capable of providing a smoking function on the basis of tobacco granules.

Some embodiments of the present disclosure are also directed to providing an aerosol generation device that can be used with a tobacco granule-based aerosol-generating article.

Some embodiments of the present disclosure are also directed to providing an aerosol generation device capable of effectively heating a tobacco granule-based aerosol-generating article.

Some embodiments of the present disclosure are also directed to providing an aerosol generation device capable of operating in a set mode among a smokeless mode and a smoking mode and an aerosol-generating article that can be used with the aerosol generation device.

Objectives of the present disclosure are not limited to the above-mentioned objectives, and other unmentioned objectives should be clearly understood by those of ordinary skill in the art to which the present disclosure pertains from the description below.

Technical Solution

Some embodiments of the present disclosure provide an aerosol generation device including a housing configured to form an accommodation space in which an aerosol-generating article is accommodated and a heater part configured to heat the aerosol-generating article accommodated in the accommodation space, wherein the aerosol-generating article includes a tobacco rod, which is filled with tobacco granules, and a filter rod.

In some embodiments, the tobacco rod may include a first filter segment, a second filter segment, and a cavity segment formed by the first filter segment and the second filter segment, and the tobacco granules may be filled in the cavity segment.

In some embodiments, the second filter segment may be disposed upstream of the cavity segment and include a paper material, the heater part may include a heating element configured to heat the tobacco rod from the inside, and a thickness of the heating element may be 2.0 mm or less.

In some embodiments, the heater part may include a heating element configured to heat the tobacco rod from the outside, and the heating element may be disposed to heat only the cavity segment.

In some embodiments, the heater part may include a heating element configured to heat the tobacco rod from the outside, and the heating element may be disposed to heat the cavity segment and disposed so that an unheated portion is formed in the vicinity of a downstream end of the cavity segment.

In some embodiments, the heater part may include a first heating element configured to heat the tobacco rod from the outside and a second heating element configured to heat the tobacco rod from the inside.

In some embodiments, the heater part may include a heating element configured to heat the tobacco rod from the outside and a heat conduction element configured to transfer heat generated from the heating element to the inside of the tobacco rod.

In some embodiments, the tobacco granules or the tobacco rod may include a particulate susceptor material, and the heater part may include an inductor configured to inductively heat the susceptor material,

Advantageous Effects

According to some embodiments of the present disclosure, an aerosol-generating article which includes a tobacco rod filled with tobacco granules and an aerosol generation device used with the aerosol-generating article may be provided. The provided aerosol-generating article can provide a smoking sensation similar to other heating-type cigarettes by using the tobacco granules.

Also, a cavity segment may be formed by filter segments located upstream and downstream of a tobacco rod, and the cavity segment may be filled with tobacco granules. Accordingly, a tobacco rod that can prevent fall-off of tobacco granules can be easily manufactured.

Also, a heater part of the aerosol generation device may heat only the cavity segment or have a structure in which heating is simultaneously performed from the inside and outside. Accordingly, the tobacco granules filled in the cavity segment can be effectively heated.

Also, the filter segments of the tobacco rod may include a paper material. Since physical properties of the filter segments hardly change due to heating by the heater part, the tobacco rod may be suitable for manufacturing the aerosol-generating article.

Also, the tobacco rod may be designed so that a vortex is generated inside the cavity segment upon a puff. In this case, since the generated vortex allows the tobacco granules to be mixed well and heated, the plurality of tobacco granules can be uniformly heated, and as a result, a tobacco smoke taste can be enhanced while a burnt taste is reduced.

The advantageous effects according to the technical spirit of the present disclosure are not limited to those mentioned above, and other unmentioned advantageous effects should be clearly understood by those of ordinary skill in the art from the description below.

MODES OF THE INVENTION

Figure 1:
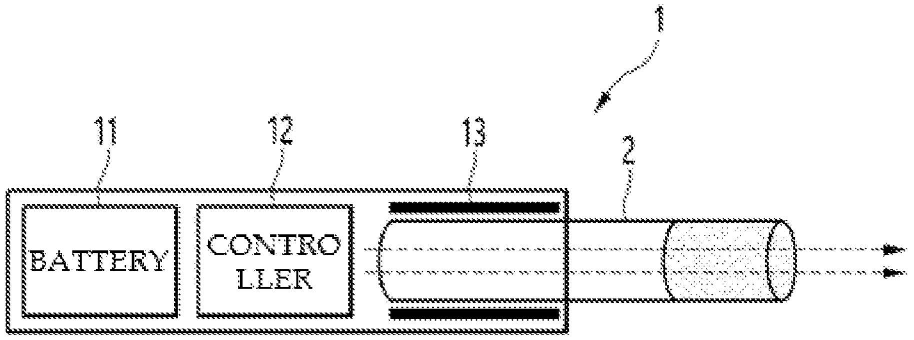
FIG. 1 is an exemplary view schematically illustrating an aerosol generation device according to some embodiments of the present disclosure.

Hereinafter, exemplary embodiments of the present disclosure will be described in detail with reference to the accompanying drawings. Advantages and features of the present disclosure and methods of achieving the same should become clear from embodiments described in detail below with reference to the accompanying drawings. However, the technical spirit of the present disclosure is not limited to the following embodiments and may be implemented in various different forms. The following embodiments only make the technical spirit of the present disclosure complete and are provided to completely inform those of ordinary skill in the art to which the present disclosure pertains of the scope of the disclosure. The technical spirit of the present disclosure is defined only by the scope of the claims.

In assigning reference numerals to components of each drawing, it should be noted that the same reference numerals are assigned to the same components where possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used in this specification have the same meaning as commonly understood by those of ordinary skill in the art to which the present disclosure pertains. Terms defined in commonly used dictionaries should not be construed in an idealized or overly formal sense unless expressly so defined herein. Terms used in this specification are for describing the embodiments and are not intended to limit the present disclosure. In this specification, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the possibility of presence or addition of one or more components, steps, operations, and/or devices other than those mentioned.

Prior to description of various embodiments of the present disclosure, some terms used in the following embodiments will be clarified.

In the following embodiments, the term "aerosol-forming agent" may refer to a material that can facilitate formation of visible smoke and/or an aerosol. Examples of the aerosol-forming agent may include glycerin (GLY), propylene glycol (PG), ethylene glycol, dipropylene glycol, diethylene glycol, triethylene glycol, tetraethylene glycol, and oleyl alcohol, but the aerosol-forming agent is not limited thereto. The term "aerosol-forming agent" may be interchangeably used with the term "moisturizer" or "wetting agent" in the art.

In the following embodiments, the term "aerosol-forming substrate" may refer to a material that is able to form an aerosol. The aerosol may include a volatile compound. The aerosol-forming substrate may be a solid or liquid.

For example, solid aerosol-forming substrates may include solid materials based on tobacco raw materials such as reconstituted tobacco leaves, shredded tobacco, and reconstituted tobacco, and liquid aerosol-forming substrates may include liquid compositions based on nicotine, tobacco extracts, and/or various flavoring agents. However, the scope of the present disclosure is not limited to the above-listed examples. The aerosol-forming substrate may further include an aerosol-forming agent in order to stably form visible smoke and/or an aerosol.

In the following embodiments, the term "aerosol generation device" may refer to a device that generates an aerosol using an aerosol-forming substrate in order to generate an aerosol that can be inhaled directly into the user's lungs through the user's mouth. Some examples of the aerosol generation device will be described below with reference to FIGS. 1 to 3.

In the following embodiments, the term "aerosol-generating article" may refer to an article that is able to generate an aerosol. The aerosol-generating article may include an aerosol-forming substrate. A typical example of the aerosol-generating article may include a cigarette, but the scope of the present disclosure is not limited thereto.

In the following embodiments, the term "upstream" or "upstream direction" may refer to a direction moving away from an oral region of a user (smoker), and the term "downstream" or "downstream direction" may refer to a direction approaching the oral region of the user. The terms "upstream" and "downstream" may be used to describe relative positions of components constituting an aerosol-generating article. For example, in an aerosol-generating article 2 illustrated in FIG. 6, a tobacco rod 21 is disposed upstream from or in an upstream direction of a filter rod 22, and the filter rod 22 is disposed downstream from or in a downstream direction of the tobacco rod 21.

In the following embodiments, the term "puff" refers to inhalation by a user, and the inhalation may be a situation in which a user draws smoke into his or her oral cavity, nasal cavity, or lungs through the mouth or nose.

In the following embodiments, the term "longitudinal direction" may refer to a direction corresponding to a longitudinal axis of an aerosol-generating article.

Hereinafter, various embodiments of the present disclosure will be described with reference to the accompanying drawings.

FIG. 1 is an exemplary view for describing an aerosol generation device 1 according to some embodiments of the present disclosure. In particular, FIG. 1 and so on illustrate an example in which an aerosol-generating article 2 is inserted (accommodated) in the aerosol generation device 1.

As illustrated in FIG. 1, the aerosol generation device 1 according to the present embodiment may include a housing, a heater part 13, a battery 11, and a controller 12. However, only the components relating to the embodiment of the present disclosure are illustrated in FIG. 1. Therefore, those of ordinary skill in the art to which the present disclosure pertains should understand that the aerosol generation device 1 may further include general-purpose components other than the components illustrated in FIG. 1. For example, the aerosol generation device 1 may further include an input module (e.g., a button, a touchable display, etc.) for receiving a command or the like from a user and an output module (e.g., a light emitting diode (LED), a display, a vibration motor, etc.) configured to output information such as a state of the device or smoking information of the device. Hereinafter, each component of the aerosol generation device 1 will be described.

The housing may form an exterior of the aerosol generation device 1. Also, the housing may form an accommodation space for accommodating the aerosol-generating article 2. The housing may be implemented using a material that can protect components therein.

Next, the heater part 13 may heat the aerosol-generating article 2 accommodated in the accommodation space. Specifically, when the aerosol-generating article 2 is accommodated in the accommodation space of the aerosol generation device 1, the heater part 13 may heat the aerosol-generating article 2 using power supplied from the battery 11.

The heater part 13 may be configured in various forms and/or ways.

For example, the heater part 13 may be configured to include an electrically-resistive heating element. For example, the heater part 13 may include an electrically insulating substrate (e.g., a substrate formed of polyimide) and an electrically conductive track, and the heating element configured to generate heat as current flows may be included in the electrically conductive track. However, the scope of the present disclosure is not limited to the above example, and the heating element may be configured in any other way as long as the heating element can be heated to a desired temperature. Here, the desired temperature may be preset in the aerosol generation device 1 (e.g., a temperature profile may be pre-stored therein) or may be set by the user.

As another example, the heater part 13 may be configured to include a heating element that operates using an induction heating method. Specifically, the heater part 13 may include an inductor (e.g., an induction coil) for heating the aerosol-generating article 2 by the induction heating method and a susceptor inductively heated by the induction coil. The susceptor may be disposed outside or inside the aerosol-generating article 2.

Also, for example, the heater part 13 may be configured to include a heating element configured to heat the aerosol-generating article 2 from the inside (hereinafter referred to as "internal heating element"), a heating element configured to heat the aerosol-generating article 2 from the outside (hereinafter referred to as "external heating element"), or a combination thereof. For example, the internal heating element may be tubular, needle-shaped, rod-shaped, or the like and disposed to pass through at least a portion of the aerosol-generating article 2, and the external heating element may be plate-shaped, cylindrical, or the like and disposed to surround at least a portion of the aerosol-generating article 2. However, the scope of the present disclosure is not limited thereto, and the shapes of the heating elements, the number of heating elements, the arrangement form of the heating elements, and the like may be designed in various ways. In order to avoid repeated description, the heating structure of the heater part 13 will be described in more detail below with reference to FIGS. 9 to 13.

Next, the battery 11 may supply power used to operate the aerosol generation device 1. For example, the battery 11 may supply power to allow the heater part 13 to heat the aerosol-generating article 2 and may also supply power necessary to operate the controller 12.

Also, the battery 11 may supply power necessary to operate electric components such as a display (not illustrated), a sensor (not illustrated), and a motor (not illustrated) that are installed in the aerosol generation device 1.

Next, the controller 12 may control the overall operation of the aerosol generation device 1. For example, the controller 12 may control the operation of the heater part 13 and the battery 11 and may also control the operation of other components included in the aerosol generation device 1. The controller 12 may control the power supplied by the battery 11, a heating temperature of the heater part 13, and the like. Also, the controller 12 may check a state of each of the components of the aerosol generation device 1 and determine whether the aerosol generation device 1 is in an operable state.

The controller 12 may be implemented with at least one controller (processor). The controller may also be implemented with an array of a plurality of logic gates or implemented with a combination of a general-purpose microcontroller and a memory which stores a program that may be executed by the microcontroller. Also, those of ordinary skill in the art to which the present disclosure pertains should understand that the controller 12 may also be implemented with other forms of hardware.

The aerosol-generating article 2 may have a structure similar to that of a general combustion-type cigarette. For example, the aerosol-generating article 2 may be divided into a first part (e.g., a tobacco rod) which includes a tobacco material (or an aerosol-forming substrate) and a second part (e.g., a filter rod) which includes a filter or the like. The entire first part may be inserted into the aerosol generation device 1, and the second part may be exposed to the outside. Alternatively, only a portion of the first part may be inserted into the aerosol generation device 1, or the entire first part and a portion of the second part may be inserted into the aerosol generation device 1. The user may smoke while holding the second part in his or her mouth.

In some embodiments, the aerosol-generating article 2 may include a tobacco rod filled with a tobacco material having a granular form. For example, a cavity formed in the tobacco rod may be filled with tobacco granules. In order to avoid repeated description, the aerosol-generating article 2 according to the present embodiment will be described in detail below with reference to FIG. 6 and so on.

Meanwhile, in some embodiments, the aerosol generation device 1 may have a smokeless function (that is, a function in which visible smoke is not generated during use or a function in which generation of visible smoke is minimized). Also, the aerosol-generating article 2 may be devised to implement the smokeless function. Specifically, the aerosol-generating article 2 may be an article filled with tobacco granules, and the aerosol generation device 1 may operate to heat the aerosol-generating article 2 at a heating temperature lower than or equal to about 270° C. In this case, visible smoke may not be generated during smoking, or generation of visible smoke may be minimized. This is because the amount of moisture and/or an aerosol-forming agent in the tobacco granules is significantly less than that in other types of tobacco materials such as shredded tobacco (e.g., shredded tobacco leaves, shredded reconstituted tobacco leaves) and reconstituted tobacco leaves, and thus the tobacco granules are able to reduce generation of visible smoke. Also, with the tobacco granules, a sufficient tobacco smoke taste can be expressed (that is, nicotine can be sufficiently transferred) at a lower heating temperature than other types of tobacco materials such as shredded tobacco and reconstituted tobacco leaves (e.g., a heating temperature of shredded tobacco is usually 270° C. or higher). Thus, the heating temperature of the heater part 130 can be lowered, and accordingly, generation of visible smoke can be further reduced. According to the present embodiment, as the smokeless function is provided, the user can use the aerosol generation device regardless of location or environment, and thus user convenience can be significantly improved. The present embodiment will be described in more detail together with the structure of the aerosol-generating article 2 with reference to FIG. 6 and so on.

Hereinafter, other types of aerosol generation devices 1 will be described with reference to FIGS. 2 to 5. However, for clarity of the present disclosure, description of content overlapping with the previous embodiment will be omitted.

Figure 2:
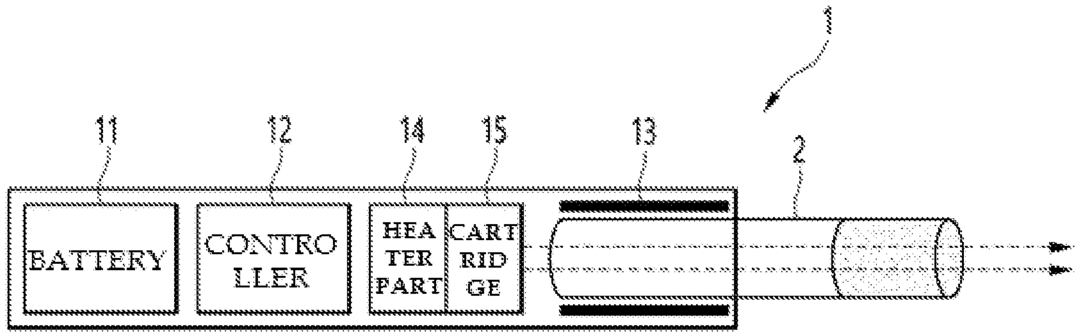
FIGS. 2 and 3 are exemplary views schematically illustrating aerosol generation devices according to some other embodiments of the present disclosure.
Figure 3:
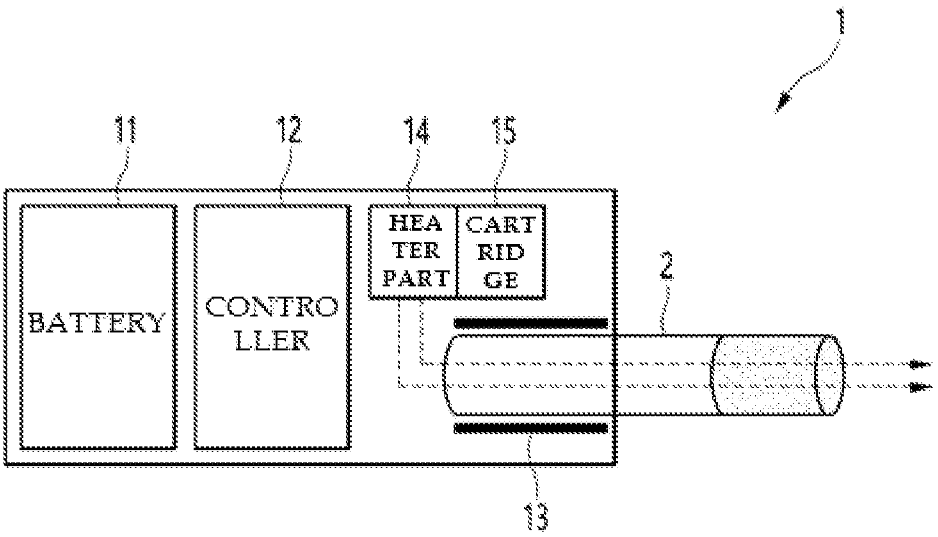

FIGS. 2 and 3 are views for describing aerosol generation devices 1 according to some other embodiments of the present disclosure.

As illustrated in FIGS. 2 and 3, the aerosol generation device 1 according to the present embodiment may further include a cartridge 15 and a cartridge heater part 14. FIG. 2 illustrates a case in which the heater part 13 (or the aerosol-generating article 2) and the cartridge heater part 14 are disposed in series, and FIG. 3 illustrates a case in which the heater part 13 (or the aerosol-generating article 2) and the cartridge heater part 14 are disposed in parallel. However, an internal structure of the aerosol generation device 1 is not limited to the examples of FIGS. 2 and 3, and the arrangement of the components may be changed in any way.

The cartridge 15 may include a liquid reservoir and a liquid transfer means. However, the present disclosure is not limited thereto, and the cartridge 15 may further include another component. Also, the cartridge 15 may be manufactured to be attachable to or detachable from the cartridge heater part 14 or may be integrally manufactured with the cartridge heater part 14.

The liquid reservoir may store a liquid composition. For example, the liquid composition may be a liquid including a tobacco-containing material (or a nicotine-containing material) or may be a liquid including a non-tobacco material. For example, the liquid composition may include water, a solvent, ethanol, a plant extract (e.g., a tobacco extract), nicotine, a flavoring, an aerosol-forming agent, a flavoring agent, or a vitamin mixture. The flavoring may include menthol, peppermint, spearmint oil, various fruit flavor components, and the like but is not limited thereto. The flavoring agent may include a component that can provide various flavors or tastes to the user. The vitamin mixture may be a mixture of one or more of vitamin A, vitamin B, vitamin C, and vitamin E but is not limited thereto. Also, examples of the aerosol-forming agent may include glycerin or propylene glycol, but the aerosol-forming agent is not limited thereto.

Next, the liquid transfer means may transfer the liquid composition stored in the liquid reservoir to the cartridge heater part 14. For example, the liquid transfer means may be a wick component made of a cotton fiber, a ceramic fiber, a glass fiber, and a porous ceramic, but the liquid transfer means is not limited thereto.

Next, the cartridge heater part 14 may heat a liquid aerosol-forming substrate (e.g., a liquid composition) stored in the cartridge 15 to form an aerosol. For example, the cartridge heater part 14 may heat a liquid composition, which is transferred thereto by the liquid transfer means, to form an aerosol. The formed aerosol may pass through the aerosol-generating article 2 and be delivered to the user. In other words, the aerosol formed due to heating by the cartridge heater part 14 may move along an airflow path of the aerosol generation device 1, and the airflow path may be configured to allow the formed aerosol to pass through the aerosol-generating article 2 and be delivered to the user. The operation, heating temperature, and the like of the cartridge heater part 14 may be controlled by the controller 12.

For example, the cartridge heater part 14 may be a metal hot wire, a metal hot plate, a ceramic heater part, or the like but is not limited thereto. Also, for example, the cartridge heater part 14 may consist of a conductive filament such as a nichrome wire and may be disposed to have a structure that is wound around the liquid transfer means. However, the present disclosure is not limited thereto.

For reference, the terms "cartridge heater part" and "cartridge" may be interchangeably used with the term "cartomizer," "atomizer," or "vaporizer" in the art.

Meanwhile, according to some embodiments of the present disclosure, the aerosol generation device 1 illustrated in FIG. 2 or 3 may operate in a smokeless mode or a smoking mode. Specifically, the aerosol generation device 1 may operate in a set mode among the smokeless mode and the smoking mode, and the operation mode may be set by the user. Hereinafter, each operation mode and the operation of the aerosol generation device 1 will be further described with reference to FIGS. 4 and 5.

Figure 4:
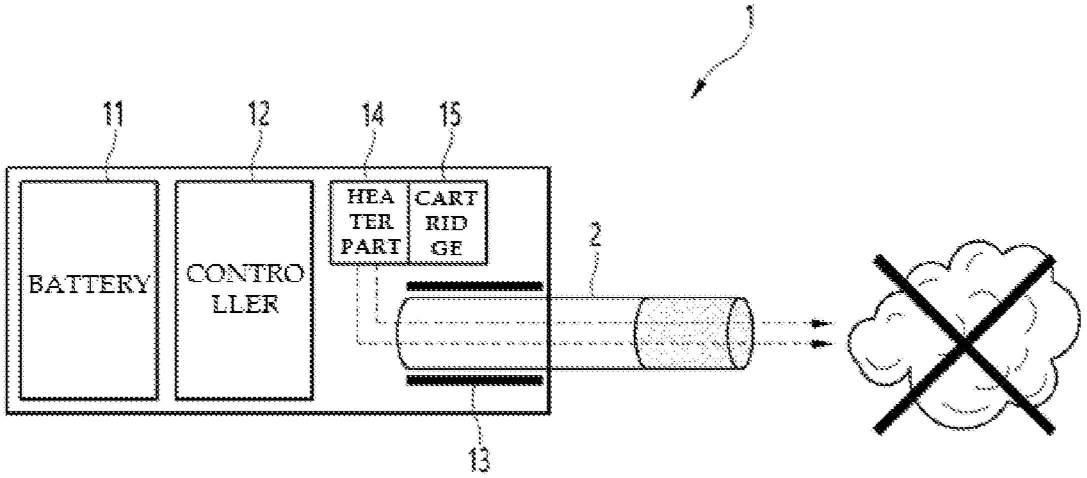
FIG. 4 illustrates a state in which the aerosol generation device according to some other embodiments of the present disclosure operates in a smokeless mode.

As illustrated in FIG. 4, the smokeless mode may be a mode in which an aerosol is generated by the aerosol generation device 1 without visible smoke (or generation of visible smoke is minimized). In order to implement the smokeless mode, the controller 12 may operate only the heater part 13 and may not operate the cartridge heater part 14. In other words, in response to determination that the smokeless mode is activated, the controller 12 may operate only the heater part 13. In this case, the cartridge 15 is not heated, and only the aerosol-generating article 2 is heated, and thus generation of visible smoke can be prevented. Specifically, since heating of the liquid stored in the cartridge 15, which generates an aerosol including visible smoke, is prevented, generation of visible smoke can also be prevented.

Figure 5:
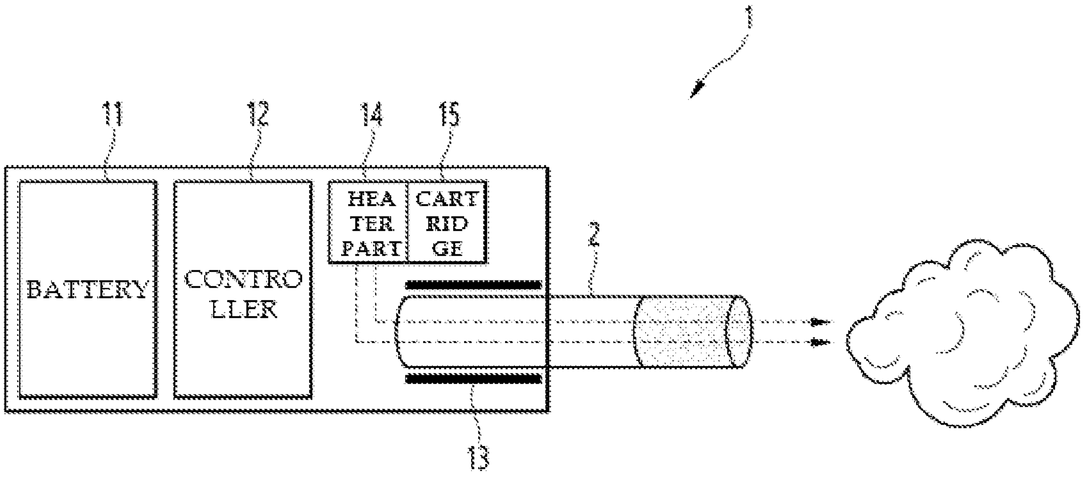
FIG. 5 illustrates a state in which the aerosol generation device according to some other embodiments of the present disclosure operates in a smoking mode.

Next, as illustrated in FIG. 5, the smoking mode may be a mode in which an aerosol is generated by the aerosol generation device 1 and visible smoke is also generated. The smoking mode may be implemented in various ways, and a specific way of implementing the smoking mode may vary according to embodiments.

In some embodiments, the controller 12 may operate both the cartridge heater part 14 and the heater part 13. In this case, by an aerosol including visible smoke being formed as the liquid stored in the cartridge 15 is heated, and the formed aerosol being released through the aerosol-generating article 2, the smoking mode can be implemented. Here, the heating temperature of the heater part 13 may be set to be lower than that in the smokeless mode. This is because, in the smoking mode, a high-temperature aerosol formed in the cartridge 15 passes through the aerosol-generating article 2, and thus a sufficient tobacco smoke taste can be ensured even when the aerosol-generating article 2 is heated at a relatively low temperature. For example, the heating temperature of the heater part 13 may be about 230° C. or higher (e.g., about 230° C. to 270° C.) in the smokeless mode and may be lower than about 230° C. (e.g., about 220° C.) in the smoking mode.

In some other embodiments, the controller 12 may operate only the cartridge heater part 14. This is because an aerosol including visible smoke is formed even when only the cartridge 15 is heated. In this case, in order to form an aerosol having a higher temperature, the heating temperature of the cartridge heater part 14 may be higher than the heating temperature in the previous embodiment.

The aerosol generation devices 1 according to some embodiments of the present disclosure have been described above with reference to FIGS. 1 to 5. Hereinafter, the aerosol-generating article 2 according to some embodiments of the present disclosure will be described with reference to FIG. 6 and so on.

Figure 6:
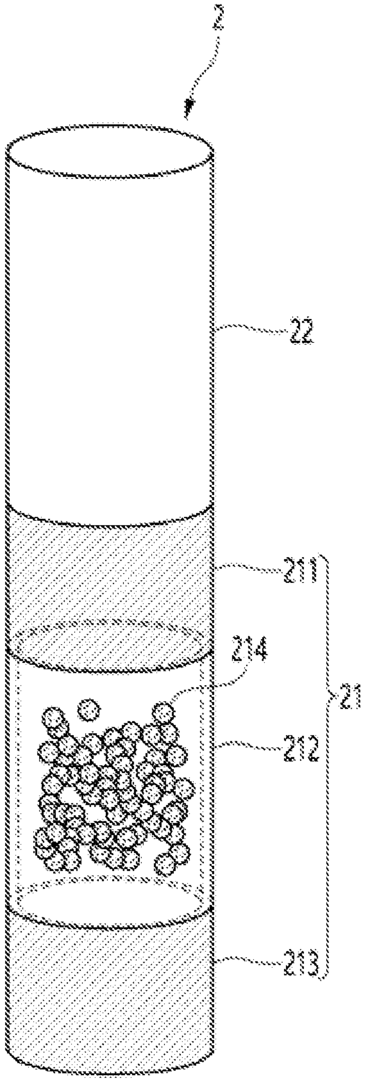
FIGS. 6 and 7 are exemplary views schematically illustrating an aerosol-generating article according to some embodiments of the present disclosure.

FIG. 6 is an exemplary view schematically illustrating the aerosol-generating article 2 according to some embodiments of the present disclosure.

As illustrated in FIG. 6, the aerosol-generating article 2 may include the filter rod 22 and the tobacco rod 21. However, only the components relating to the embodiment of the present disclosure are illustrated in FIG. 6. Therefore, those of ordinary skill in the art to which the present disclosure pertains should understand that the aerosol-generating article 2 may further include general-purpose components other than the components illustrated in FIG. 6. Hereinafter, each component of the aerosol-generating article 2 will be described.

The filter rod 22 may be disposed downstream of the tobacco rod 21 and perform an aerosol filtering function. To this end, the filter rod 22 may include a filter material such as paper, a cellulose acetate fiber, or the like. The filter rod 22 may further include a wrapper wrapped around the filter material.

The filter rod 22 may be manufactured in various shapes. For example, the filter rod 22 may be a cylindrical rod or may be a tubular rod which includes a hollow formed therein. Also, the filter rod 22 may be a recessed rod. In a case in which the filter rod 22 is made of a plurality of segments, at least one of the plurality of segments may be manufactured in a different shape.

The filter rod 22 may be manufactured to generate a flavor. As an example, a flavoring liquid may be sprayed onto the filter rod 22, and a separate fiber having a flavoring liquid applied thereon may be inserted into the filter rod 22. As another example, the filter rod 22 may include at least one capsule (not illustrated) containing a flavoring liquid.

Figure 7:
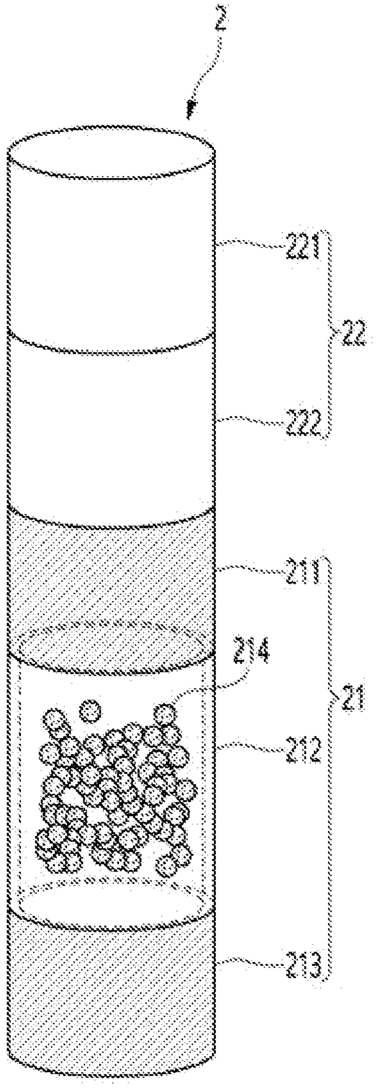

FIG. 6 illustrates an example in which the filter rod 22 is made of a single segment, but the scope of the present disclosure is not limited thereto, and the filter rod 22 may also be made of a plurality of segments. For example, as illustrated in FIG. 7, the filter rod 22 may be made of a cooling segment 222 configured to perform an aerosol cooling function and a mouthpiece segment 221 configured to perform an aerosol filtering function. Alternatively, in some cases, the filter rod 22 may further include at least one segment configured to perform another function.

For reference, the cooling segment 222 may be manufactured in various forms. For example, the cooling segment 222 may be manufactured in the form of a paper tube, a cellulose acetate filter having a hollow formed therein, a cellulose acetate filter having a plurality of holes formed therein, a filter filled with a polymer material or biodegradable polymer material, or the like. However, the form of the cooling segment 222 is not limited thereto, and the cooling segment 222 may be manufactured in any other form as long as the cooling segment 222 can perform an aerosol cooling function. The polymer material or biodegradable polymer material may be a polylactic acid (PLA) woven material but is not limited thereto.

Also, for example, the mouthpiece segment 221 may be a cellulose acetate filter (that is, a filter made of a cellulose acetate fiber) but is not limited thereto. The above description of the filter rod 22 may also apply to the mouthpiece segment 221.

Description will be given by referring again to FIG. 6.

Next, the tobacco rod 21 may be a tobacco rod including a cavity or a cavity segment 212 and may, when heated, supply tobacco components (or tobacco smoke taste components) such as nicotine.

As illustrated, the tobacco rod 21 may include a first filter segment 211, a second filter segment 213, and the cavity segment 212 formed by the first filter segment 211 and the second filter segment 213. Also, the cavity segment 212 may be filled with tobacco granules 214 (that is, a tobacco material having a granular form). The tobacco rod 21 may further include a wrapper wrapped around the rod.

The first filter segment 211 may be a filter segment forming the cavity segment 212 and may be disposed downstream of the cavity segment 212. The first filter segment 211 may also perform an aerosol filtering function, an aerosol cooling function, and the like in addition to a cavity forming function.

In some embodiments, the first filter segment 211 may include a paper material. In other words, the first filter segment 211 may be made of a paper filter. In order to easily secure an airflow path, the paper material may be arranged in the longitudinal direction. However, the present disclosure is not limited thereto. According to the present embodiment, the tobacco rod 21 suitable for the heating-type aerosol generation device 1 may be manufactured. Specifically, a cellulose acetate fiber melts or contracts when heated to a certain temperature or higher and thus it is not suitable for the tobacco rod portion that is heated by the heater part 13. On the other hand, the paper material is hardly denatured due to heat and thus may be suitable for the tobacco rod portion, and in this way, the tobacco rod 21 suitable for the heating-type aerosol generation device 1 can be manufactured. However, in some other embodiments, the first filter segment 211 may be made of a cellulose acetate filter. In this case, it is possible to achieve improved removability of the first filter segment 211.

Also, in some embodiments, the first filter segment 211 may include a water-resistant or grease-resistant paper material. In this case, a problem that components of smoke (e.g., moisture, an aerosol-forming agent) contained in an aerosol are absorbed while passing through the first filter segment 211 and cause a decrease in visible vapor production can be significantly alleviated. For example, in a case in which the first filter segment 211 includes a typical paper material, due to the paper material having a property of absorbing moisture, the above-mentioned components of smoke may be absorbed, and thus visible vapor production may decrease. However, when the water-resistant or grease-resistant paper material is applied, since the absorption of the components of smoke hardly occurs, the problem of vapor production reduction can be addressed.

Also, in some embodiments, the resistance to draw of the first filter segment 211 or the second filter segment 213 may be in a range of about 50 $mmH_2O$/60 mm to 150 $mmH_2O$/60 mm and may be in a range of about 50 $mmH_2O$/60 mm to 130 $mmH_2O$/60 mm, in a range of about $mmH_2O$/60 mm to 120 $mmH_2O$/60 mm, in a range of about 50 $mmH_2O$/60 mm to 110 $mmH_2O$/60 mm, in a range of about 50 $mmH_2O$/60 mm to 100 $mmH_2O$/60 mm, in a range of about $mmH_2O$/60 mm to 90 $mmH_2O$/60 mm, in a range of about 50 $mmH_2O$/60 mm to 80 $mmH_2O$/60 mm, or in a range of about 50 $mmH_2O$/60 mm to 70 $mmH_2O$/60 mm. Within such numerical ranges, a suitable inhaling sensation can be ensured. Also, the probability of generation of a vortex in the cavity segment 212 may be increased due to the suitable inhaling sensation, and thus an effect of uniformly heating the plurality of tobacco granules 214 can be achieved. This will be further described below with reference to FIG. 8. Also, it was confirmed that suitable vapor production is ensured within the above numerical ranges when the filter segments 211 and 213 are paper filters (refer to Experimental Example 1).

Next, the second filter segment 213 may be a filter segment forming the cavity segment 212 and may be disposed upstream of the cavity segment 212. The second filter segment 213 may also perform a function of preventing fall-off of the tobacco granules 214. In addition, in a case in which the aerosol-generating article 2 is inserted into the aerosol generation device 1, the second filter segment 213 may allow the cavity segment 212 to be disposed at a suitable position in the aerosol generation device 1. Also, the second filter segment 213 may prevent the tobacco rod 21 from being detached to the outside and also prevent a liquefied aerosol from flowing from the tobacco rod 21 to the aerosol generation device 1 during smoking.

In some embodiments, the second filter segment 213 may include a paper material. In other words, the second filter segment 213 may be made of a paper filter. In order to easily secure an airflow path, the paper material may be arranged in the longitudinal direction. However, the present disclosure is not limited thereto. According to the present embodiment, the tobacco rod 21 suitable for the heating-type aerosol generation device 1 may be manufactured. Specifically, a cellulose acetate fiber melts or contracts upon contact with an internal heating element and thus may accelerate fall-off of the tobacco granules 214. However, a heat-resistant paper material can significantly mitigate such a phenomenon.

Also, in some embodiments, the second filter segment 213 may include a water-resistant or grease-resistant paper material. In this case, as mentioned above, the problem that the visible vapor production is decreased can be significantly alleviated.

Meanwhile, the paper material included in the filter segments 211 and 213 may have various physical properties.

In some embodiments, when measured with a 3 M Kit Test, grease resistance of the paper material may be about 4 or more (that is, about 4 or more in a range of 1 to 12) and may be greater than or equal to about 5, 6, 7, or 8. Within such numerical ranges, the problem that visible vapor production (that is, the amount of visible smoke generated) is decreased due to moisture absorption by the paper material (e.g., visible vapor production decreases in the smoking mode) can be addressed.

Also, in some embodiments, a thickness of the paper material may be in a range of about 30 μm to 50 μm and may be in a range of about 33 μm to 47 μm, in a range of about 35 μm to 45 μm, or in a range of about 37 μm to 42 μm.

Also, in some embodiments, a basis weight of the paper material may be in a range of about 20 $g/m^2$ to 40 $g/m^2$ and may be in a range of about 23 $g/m^2$ to 37 $g/m^2$, in a range of about $g/m^2$ to 35 $g/m^2$, or in a range of about 27 $g/m^2$ to 33 $g/m^2$.

Also, in some embodiments, a tensile strength of the paper material may be about 2.5 kgf/15 mm or higher and may be higher than or equal to about 2.8 kgf/15 mm, 3.2 kgf/15 mm, or 3.5 kgf/15 mm.

Also, in some embodiments, an elongation of the paper material may be about 0.8% or higher and may be higher than or equal to about 1.0%, 1.2%, or about 1.5%.

Also, in some embodiments, a bending stiffness of the paper material may be about 100 $cm^3$ or higher and may be higher than or equal to about 120 $cm^3$, 150 $cm^3$, or 180 $cm^3$.

Also, in some embodiments, the ash content in the paper material may be about 1.5% or lower and may be lower than or equal to about 1.2%, 1.0%, or 0.8%.

Also, in some embodiments, a paper width of the paper material may be in a range of about 80 mm to 250 mm and may be in a range of about 90 mm to 230 mm, in a range of about 100 mm to 200 mm, in a range of about 120 mm to 180 mm, or in a range of about 120 mm to 150 mm. It was confirmed that within such numerical ranges, the filter segments 211 and 213 have suitable resistance to draw, and suitable vapor production is ensured (refer to Experimental Example 1).

Next, the cavity segment 212 may be a segment including a cavity and may be disposed between the first filter segment 211 and the second filter segment 213. That is, the cavity segment 212 may be formed by the first filter segment 211 and the second filter segment 213.

The cavity segment 212 may be manufactured in various ways. As an example, the cavity segment 212 may be manufactured in a form that includes a tubular structure such as a paper tube. As another example, the cavity segment 212 may be manufactured by wrapping a cavity, which is formed by the two filter segments 211 and 213, with a wrapper made of a suitable material. However, the scope of the present disclosure is not limited thereto, and the cavity segment 212 may be manufactured in any other way as long as the cavity segment 212 can be filled with the tobacco granules 214.

A length of the cavity segment 212 may be in the range of about 8 mm to 12 mm, but the scope of the present disclosure is not limited to such a numerical range.

As illustrated, the cavity segment 212 may be filled with the tobacco granules 214. With the tobacco granules 214, a sufficient tobacco smoke taste can be expressed at a lower heating temperature as compared to other types of tobacco materials (e.g., shredded tobacco leaves, reconstituted tobacco leaves, etc.), and thus power consumption of the heater part 13 can be reduced. Further, since it is easier to reduce the amount of moisture and/or an aerosol-forming agent in the tobacco granules 214 than in other types of tobacco materials (e.g., shredded tobacco leaves, reconstituted tobacco leaves, etc.) (that is, it is easy to produce tobacco granules with low moisture content or low aerosol-forming agent content), the aerosol-generating article (e.g., 2 of FIG. 7 or 8) capable of implementing the smokeless function of the aerosol generation device 1 can be easily manufactured by using the illustrated tobacco rod 21.

The tobacco granules 214 may have various diameters, densities, filling rates, composition ratios of constituents, heating temperatures, and the like, and values thereof may vary according to embodiments.

In some embodiments, a diameter of the tobacco granules 214 may be in a range of about 0.3 mm to 1.2 mm. Within such numerical ranges, a suitable hardness and ease of manufacture of the tobacco granules 214 may be ensured, and the probability of the generation of a vortex in the cavity segment 212 may increase. The vortex generation will be further described below with reference to FIG. 8.

Also, in some embodiments, a size of the tobacco granules 214 may be in a range of about 15 mesh to 50 mesh and may be in a range of about 15 mesh to 45 mesh, in a range of about 20 mesh to 45 mesh, in a range of about 25 mesh to 45 mesh, or in a range of about 25 mesh to 40 mesh. Within such numerical ranges, a suitable hardness and ease of manufacture of the tobacco granules 214 may be ensured, the fall-off of the tobacco granules 214 may be minimized, and the probability of the generation of a vortex in the cavity segment 212 may increase.

Also, in some embodiments, a density of the tobacco granules 214 may be in a range of about 0.5 g/cm$^3$ to 1.2 g/cm$^3$ and may be in a range of about 0.6 g/cm$^3$ to 1.0 g/cm$^3$, 0.7 g/cm$^3$ to 0.9 g/cm$^3$, or 0.6 g/cm$^3$ to 0.8 g/cm$^3$. Within such numerical ranges, a suitable hardness of the tobacco granules 214 may be ensured, and the probability of the generation of a vortex in the cavity segment 212 may increase. The vortex generation will be further described below with reference to FIG. 8.

Also, in some embodiments, a hardness of the tobacco granules 214 may be about 80% or higher, may be higher than or equal to 85% or 90%, and may be higher than or equal to 91%, 93%, 95%, or 97%. Within such numerical ranges, ease of manufacture of the tobacco granules 214 may be improved, and breakage of the tobacco granules 214 may be minimized such that ease of manufacture of the aerosol-generating article 2 may also be improved. In the present embodiment, the hardness of the tobacco granules 214 may be a value measured on the basis of KSM-1802 ("activated carbon test method"), which is a national standard test method of Korea. Reference should be made to the KSM-1802 for details of a method of measuring the hardness and the meanings of measured values.

Also, in some embodiments, a filling rate of the tobacco granules 214 in the cavity segment 212 may be about 80 vol % or lower and may be lower than or equal to about 70 vol %, 60 vol %, or 50 vol %. Within such numerical ranges, the probability of the generation of a vortex in the cavity segment 212 may increase. The vortex generation will be further described below with reference to FIG. 8. Also, in order to ensure a suitable tobacco smoke taste, the filling rate of the tobacco granules 214 may be higher than or equal to about 20 vol %, 30 vol %, or about 40 vol %.

Also, in some embodiments, the tobacco granules 214 may include moisture at about 20 wt % or lower or at about 15 wt % or lower, 12 wt % or lower, 10 wt % or lower, 7 wt % or lower, or 5 wt % or lower. Within such numerical ranges, generation of visible smoke may be significantly reduced, and the smokeless function of the aerosol generation device 1 may be easily implemented. However, in some other embodiments, the tobacco granules 214 may include moisture higher than about 20 wt %.

Also, in some embodiments, the tobacco granules 214 may include an aerosol-forming agent at about 10 wt % or lower, and preferably about 7 wt %, 5 wt %, 3 wt %, or 1 wt %. Alternatively, the tobacco granules 214 may not include an aerosol-forming agent. Within the above numerical ranges, generation of visible smoke may be significantly reduced, and the smokeless function of the aerosol generation device 1 may be easily implemented. However, in some other embodiments, the tobacco granules 214 may include an aerosol-forming agent higher than about 10 wt %.

Also, in some embodiments, a heating temperature of the tobacco granules 214 may be lower than or equal to about 270° C., 260° C., 250° C., 240° C., or 230° C. In other words, the heater part 13 may heat the tobacco rod 21 at a heating temperature in the above ranges. Within such numerical ranges, it is possible to address a problem of a burnt taste developing due to the tobacco granules 214 being overheated. Further, this minimizes generation of visible smoke while ensuring a suitable tobacco smoke taste, and thus the smokeless function of the aerosol generation device 1 can be easily implemented. In more detail, while other types of tobacco materials such as shredded tobacco and reconstituted tobacco leaves can express a sufficient tobacco smoke taste only when heated to about 270° C. or higher, the tobacco granules 214 can express a sufficient tobacco smoke taste even when heated to a lower temperature, and thus power consumption of the heater part 13 can be reduced, and generation of visible smoke can be easily suppressed. Also, due to such characteristics, the tobacco granules 214 may be more suitable for implementing the smokeless function of the aerosol generation device 1 than other types of tobacco materials.

Also, in some embodiments, nicotine content on a wet basis in the tobacco granules 214 may be in a range of about 1.0% to 4.0% and may be in a range of about 1.5% to 3.5%, 1.8% to 3.0%, or 2.0% to 2.5%. Within such numerical ranges, an appropriate level of tobacco smoke taste can be ensured.

Also, in some embodiments, nicotine content on a dry basis in the tobacco granules 214 may be in a range of about 1.2% to 4.2% and may be in a range of about 1.7% to 3.7%, 2.0% to 3.2%, or 2.2% to 2.7%. Within such numerical ranges, an appropriate level of tobacco smoke taste can be ensured.

Meanwhile, although not clearly illustrated, the aerosol-generating article 2 may be wrapped by at least one wrapper. As an example, the aerosol-generating article 2 may be wrapped by a single wrapper. As another example, the aerosol-generating article 2 may be wrapped by two or more wrappers that overlap each other. For example, the tobacco rod 21 may be wrapped by a first wrapper, and the filter rod 22 may be wrapped by a second wrapper. Also, the wrapped tobacco rod 21 and filter rod 22 may be combined by a separate wrapper, and the entire aerosol-generating article 2 may be wrapped again by a third wrapper. When each of the tobacco rod 21 or the filter rod 22 is made of a plurality of segments, each segment may be wrapped by a separate wrapper. Also, the entire aerosol-generating article 2 in which the segments wrapped by separate wrappers are combined may be wrapped again by another wrapper. At least one hole through which outside air enters or an internal gas leaks may be formed in the wrapper.

The aerosol-generating article 2 according to some embodiments of the present disclosure has been described above with reference to FIGS. 6 and 7. According to the above description, the aerosol-generating article 2 filled with the tobacco granules 214 may be provided. The aerosol-generating article 2 can provide a better smoking sensation and a better sense of familiarity to a user as compared to cartridge-type products (that is, cartridge products filled with tobacco granules) and can also reduce manufacturing costs.

Also, the aerosol-generating article 2 suitable for implementing the smokeless function of the aerosol generation device 1 may be provided. Specifically, the aerosol-generating article 2 includes the tobacco rod 21 filled with the tobacco granules 214, and since the moisture content and/or the aerosol-forming agent content in the tobacco granules 214 is significantly lower than that in other types of tobacco materials such as shredded tobacco (e.g., shredded tobacco leaves, shredded reconstituted tobacco leaves) and reconstituted tobacco leaves, generation of visible smoke can be significantly reduced. Further, since the tobacco granules 214 are able to express a sufficient tobacco smoke taste even at a relatively low temperature as compared to the other types of tobacco materials, the heating temperature of the aerosol generation device 1 may be set to be relatively low, and due to the heating temperature being low, the generation of visible smoke can be further reduced.

Also, the cavity segment 212 may be formed by the filter segments 211 and 213 located upstream and downstream of the tobacco rod 21, and the cavity segment 212 may be filled with the tobacco granules 214. Accordingly, the tobacco rod 21 that can minimize fall-off of the tobacco granules 214 can be easily manufactured.

Also, the filter segments 211 and 213 may be made of a paper filter. In this case, a problem that physical properties of the filter segments 211 and 213 change due to heating by the heater part 13 can be prevented.

Meanwhile, the inventors of the present disclosure have confirmed that, when a specific condition is satisfied, a vortex is generated in the cavity segment 212 upon a puff, and due to the generated vortex, the plurality of tobacco granules 214 are mixed and uniformly heated. Hereinafter, how the vortex is generated and conditions therefor will be described with reference to FIG. 8.

Figure 8:
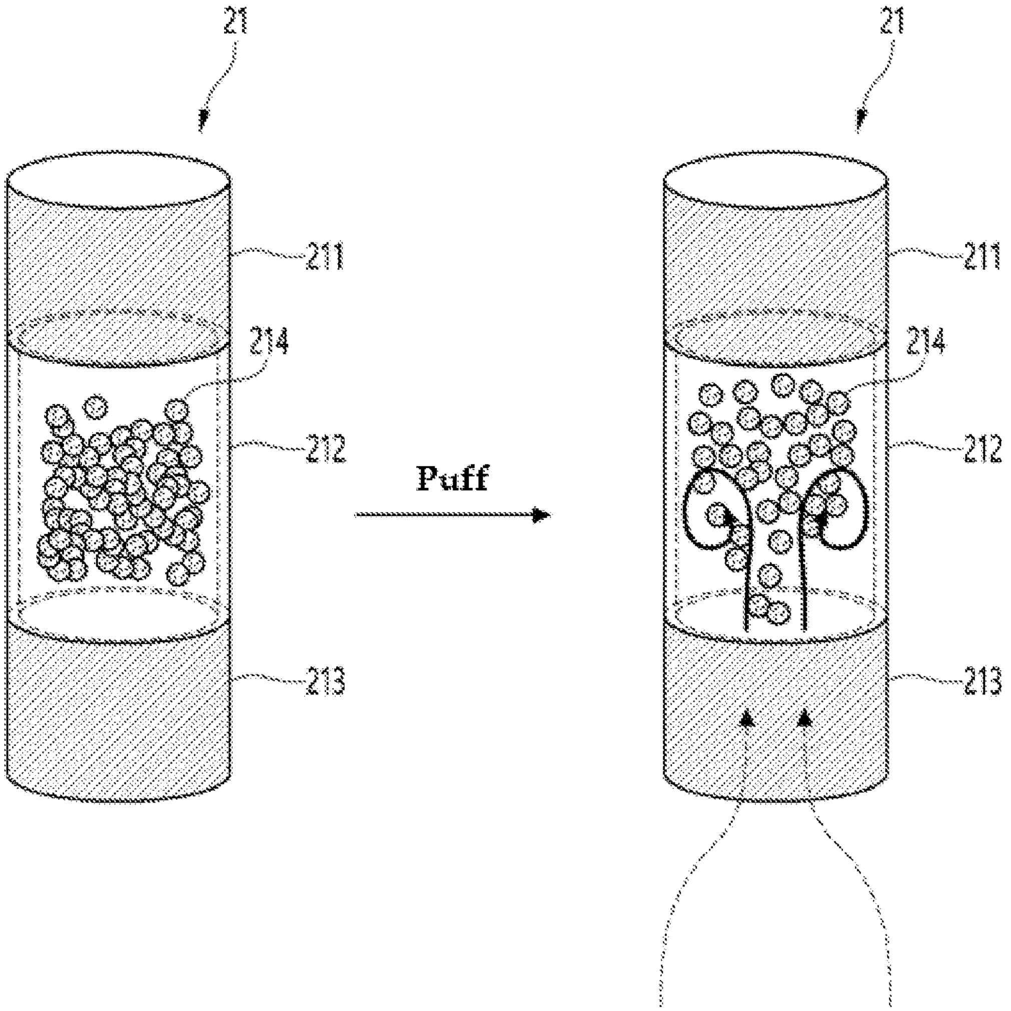
FIG. 8 is an exemplary view for describing how a vortex is generated in the aerosol-generating article and conditions therefor according to some embodiments of the present disclosure.

FIG. 8 is an exemplary view for describing how the vortex is generated in the aerosol-generating article 2 and conditions therefor according to some embodiments of the present disclosure. For convenience of understanding, FIG. 8 and so on illustrate only the tobacco rod 21 without the filter rod 22.

As illustrated in FIG. 8, when a specific condition is satisfied, an airflow entering through the second filter segment 213 due to a puff (refer to dotted arrows) may form a vortex in the cavity segment 212. For example, as the airflow entering due to a puff meets the plurality of tobacco granules 214 moving in a downstream direction due to the puff, an irregular airflow may be formed, and in this process, a vortex may be generated. Also, due to the generated vortex, the plurality of tobacco granules 214 may be mixed well and uniformly heated. For example, as tobacco granules 214 heated more and tobacco granules 214 heated less are mixed and the positions of the tobacco granules 214 change, an effect of uniformly heating the plurality of tobacco granules 214 can be achieved. Accordingly, it is possible to reduce a burnt taste and enhance a tobacco smoke taste during smoking.

In a continuous research process, the inventors of the present disclosure have confirmed that the above-described vortex generation occurs and have confirmed through experiments that the probability of vortex generation significantly increases under certain conditions. Hereinafter, conditions for the vortex generation will be described.

First, a first condition relates to a filling rate of the cavity segment 212. This is because a sufficient empty space should be present in the cavity segment 212 for the plurality of tobacco granules 214 to easily move and be mixed. According to experimental results, it was confirmed that a vortex is generated well when a filling rate of the tobacco granules 214 in the cavity segment 212 is about 80 vol % or lower, and it was confirmed that the probability of vortex generation further increases when the filling rate of the tobacco granules 214 in the cavity segment 212 is about 70 vol % or lower.

Next, a second condition relates to a density of the tobacco granules 214. This is because when the weight of the tobacco granules 214 is too heavy, it is difficult for the tobacco granules 214 to move due to a puff or an airflow, and the tobacco granules 214 may act as strong resistance to the entering airflow. According to experimental results, it was confirmed that a vortex is generated well when the density of the tobacco granules 214 is about 1.2 g/cm$^3$ or lower, and it was confirmed that the probability of vortex generation further increases when the density of the tobacco granules 214 is about 1.0 g/cm$^3$ or lower.

Next, a third condition relates to a diameter of the tobacco granules 214. This is because the tobacco granules 214 may act as strong resistance to the entering airflow also when the diameter of the tobacco granules 214 is too large. According to experimental results, it was confirmed that a vortex is generated well when the diameter of the tobacco granules 214 is about 1.2 mm or less, and it was confirmed that the probability of vortex generation further increases when the diameter of the tobacco granules 214 is about 1.0 mm or less.

Next, a fourth condition relates to resistance to draw of the first filter segment 211. This is because when the resistance to draw is too low, false puffs may occur and an inhaling force caused by a puff may not be delivered to the cavity segment 212. According to experimental results, it was confirmed that a vortex is generated well when the resistance to draw of the first filter segment 211 is about 50 $mmH_2O/60$ mm or higher, and it was confirmed that the probability of vortex generation further increases when the resistance to draw of the first filter segment 211 is about 70 $mmH_2O/60$ mm or higher.

The conditions relating to how a vortex is generated have been described above with reference to FIG. 8. Hereinafter, a heating structure of the heater part 13 according to some embodiments of the present disclosure will be described with reference to FIGS. 9 to 13.

First, a heating structure of the heater part 13 according to a first embodiment of the present disclosure will be described with reference to FIG. 9.

Figure 9:
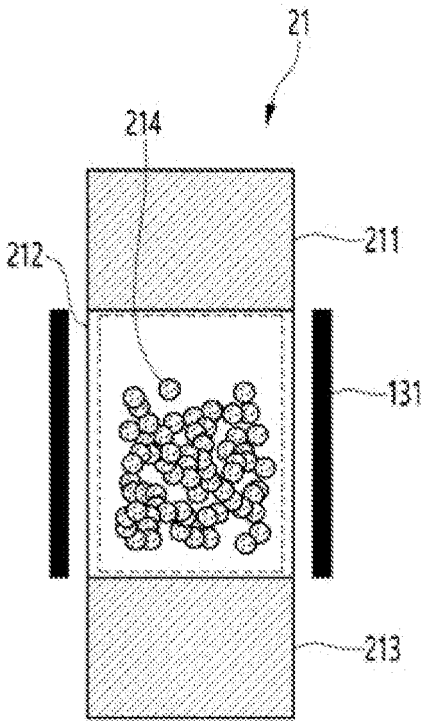
FIG. 9 is an exemplary view for describing a heating structure of a heater part according to a first embodiment of the present disclosure.

As illustrated in FIG. 9, the heater part 13 according to the present embodiment may be configured to include an external heating element 131, and the external heating element 131 may be disposed to heat only the cavity segment 212. For example, the external heating element 131 may be disposed in a form that surrounds at least a portion of the cavity segment 212.

In such a case, it is possible to address a problem that physical properties of the filter segments 211 and 213 change due to heat of the heater part 13 and a problem that visible vapor production (that is, the amount of visible smoke generated) is decreased due to moisture absorption by the filter segments 211 and 213. For example, in a case in which the filter segments 211 and 213 are cellulose acetate filters, a problem that a cellulose acetate fiber melts or contracts due to heat of the heater part 13 may occur, but this problem can be addressed. As another example, in a case in which the filter segments 211 and 213 are paper filters, a problem that vapor production decreases in the smoking mode as moisture absorption by a paper material increases due to heat of the heater part 13 may occur, but this problem can also be addressed.

Hereinafter, a heating structure of the heater part 13 according to a second embodiment of the present disclosure will be described with reference to FIG. 10. For clarity of the present disclosure, description of content overlapping with the previous embodiment will be omitted.

Figure 10:
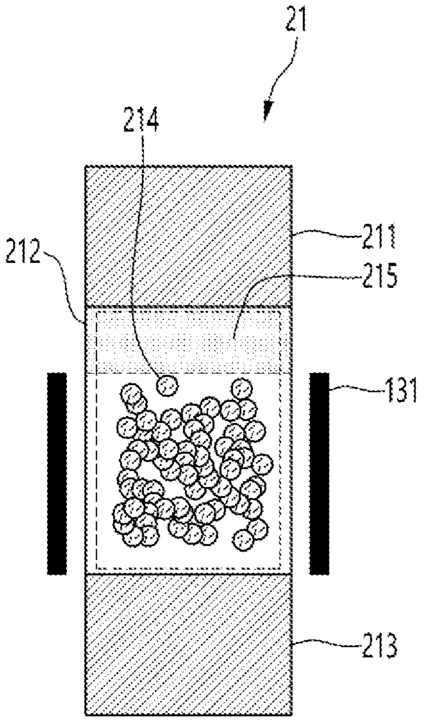
FIG. 10 is an exemplary view for describing a heating structure of a heater part according to a second embodiment of the present disclosure.

As illustrated in FIG. 10, the heater part 13 according to the present embodiment may be configured to include an external heating element 131. Also, the external heating element 131 may be disposed to heat only the cavity segment 212 and may be disposed so that an unheated portion 215 is formed in the vicinity of a downstream end of the cavity segment 212. For example, the external heating element 131 may be disposed in a form that surrounds the cavity segment 212 except for the unheated portion 215.

In such a case, heating efficiency of the heater part 13 can be improved, and the probability of vortex generation can also be further increased. Specifically, while the power consumption is reduced due to a decrease in a heating area of the external heating element 131, performance of heating the tobacco granules 214 is maintained as it is, and thus the heating efficiency can be improved. In other words, during smoking, most of the tobacco granules 214 are located at an upstream portion of the cavity segment 212 due to gravity, and since the external heating element 131 heats the upstream portion of the cavity segment 212 where most of the tobacco granules 214 are located, the amount of heat substantially transferred to the tobacco granules 214 may hardly decrease even when the heating area is reduced. Further, a temperature difference may occur in the cavity segment 212, and thus the probability of vortex generation may increase. For example, due to a temperature difference in the cavity segment 212 (e.g., the upstream portion thereof is heated to a relatively higher temperature), an airflow in the downstream direction may be promoted, and the probability of vortex generation may further increase.

Meanwhile, in some embodiments, the heater part 13 may be configured to include a first external heating element configured to heat the upstream portion of the cavity segment 212 and a second external heating element configured to heat a downstream portion of the cavity segment 212, and the controller 12 may control a heating temperature of the first external heating element to be higher than a heating temperature of the second external heating element. Even in this case, effects similar to those described above can be achieved.

Also, in some embodiments, the heater part 13 may be configured to include a plurality of external heating elements configured to heat different portions of the cavity segment 212 to different temperatures. For example, the heater part 13 may be configured to include a first external heating element configured to heat a first portion of the cavity segment 212, a second external heating element configured to heat a second portion of the cavity segment 212, and a third external heating element configured to heat a third portion of the cavity segment 212, and the controller 12 may operate the external heating elements at different temperatures. In this case, since different portions of the cavity segment 212 are heated to different temperatures, an airflow inside the cavity segment 212 may become complicated, and thus the probability of vortex generation may further increase.

Hereinafter, a heating structure of the heater part 13 according to a third embodiment of the present disclosure will be described with reference to FIG. 11.

Figure 11:
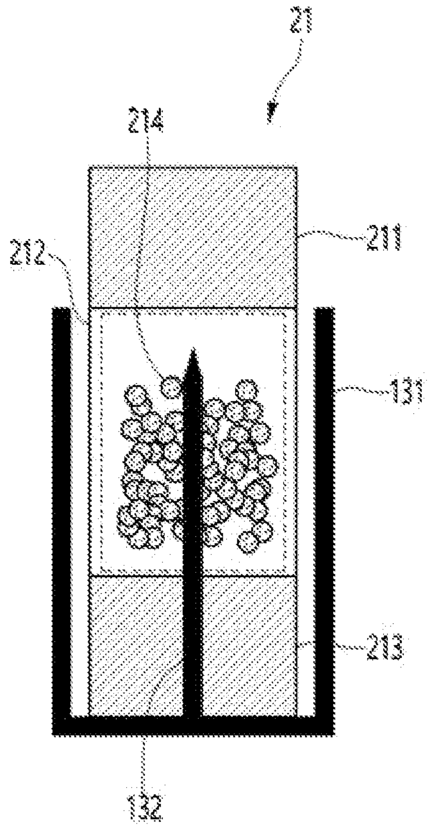
FIG. 11 is an exemplary view for describing a heating structure of a heater part according to a third embodiment of the present disclosure.

As illustrated in FIG. 11, the heater part 13 according to the present embodiment may be configured to include an internal heating element 132 and an external heating element 131. The heater part 13 may simultaneously heat the cavity segment 212 from the inside and outside using the two heating elements 131 and 132 to uniformly heat the plurality of tobacco granules 214. However, a specific way of implementing the heater part 13 may vary.

As an example, the internal heating element 132 and the external heating element 131 may be implemented to be simultaneously controlled by the controller 12. Here, the two heating elements 131 and 132 may be manufactured in a physically integrated form as illustrated or may be manufactured to have separate forms. In any case, the complexity of a circuit configuration between the controller 12 and the heater part 13 can be reduced.

As another example, the internal heating element 132 and the external heating element 131 may be implemented to be independently controlled by the controller 12. For example, the two heating elements 131 and 132 may be manufactured to have separate forms and may be controlled to different temperatures by the controller 12. In this example, the controller 12 may operate the internal heating element 132 at a heating temperature lower than a heating temperature of the external heating element 131 or may operate the internal heating element 132 only under certain conditions (e.g., operate the internal heating element 132 upon each puff or operate the internal heating element 132 only during a preheating time, etc.). In this case, it is possible to significantly alleviate a problem of a burnt taste developing due to the tobacco granules 214 being overheated by the internal heating element 132. For example, it is possible to significantly alleviate a problem of a burnt taste developing as some of the tobacco granules 214 are heated due to being in continuous contact with the internal heating element 132.

Meanwhile, in some embodiments, a thickness of the internal heating element 132 may be about 4.0 mm or less and may be less than or equal to about 3.0 mm, 2.5 mm, or 2.0 mm. Within such numerical ranges, it is possible to easily address a problem that the tobacco rod 21 is pushed upon insertion of the internal heating element 132 or a filter segment (e.g., 213) is damaged due to the internal heating element 132, and the fall-off of the tobacco granules 214 through a damaged portion of the filter segment (e.g., 213) can also be minimized. For example, in a case in which the second filter segment 213 is a paper filter and the thickness of the internal heating element 132 is thick, upon insertion of the internal heating element 132, a problem that the internal heating element 132 is blocked by a paper material and the tobacco rod 21 is pushed may occur. Alternatively, a problem that the second filter segment 213 is severely damaged due to the internal heating element 132 passing therethrough and the tobacco granules 214 fall off to the outside through the damaged portion may also occur. However, it is possible to address such problems when the thickness of the internal heating element 132 is within the above numerical ranges.

Also, in some embodiments, the internal heating element 132 may have a sharp shape such as a semi-conical shape. In this case, damage to the second filter segment 213 due to the internal heating element 132 and the fall-off of the tobacco granules 214 can be minimized.

Hereinafter, a heating structure of the heater part 13 according to a fourth embodiment of the present disclosure will be described with reference to FIG. 12.

Figure 12:
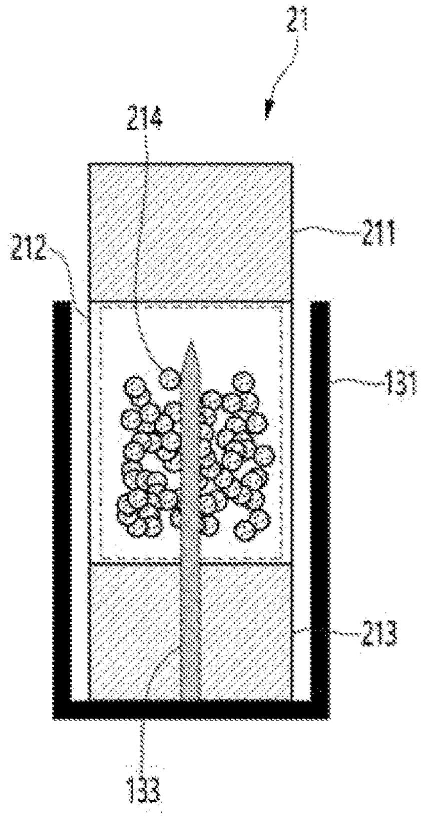
FIG. 12 is an exemplary view for describing a heating structure of a heater part according to a fourth embodiment of the present disclosure.

As illustrated in FIG. 12, the heater part 13 according to the present embodiment may be configured to include an external heating element 131 and a heat conduction element 133 configured to heat the inside of the tobacco rod 21. Here, the heat conduction element 133 may be made of a thermally conductive material and disposed to thermally come into contact with the external heating element 131 and may serve to transfer heat generated in the external heating element 131 to the inside of the tobacco rod 21.

In such a case, since the tobacco granules 214 are heated by conductive heat inside the cavity segment 212, it is possible to significantly alleviate a problem that the tobacco granules 214 are overheated. Further, since only the external heating element 131 is connected via a circuit to the controller 12, the complexity of the circuit configuration can be reduced.

Hereinafter, a heating structure of the heater part 13 according to a fifth embodiment of the present disclosure will be described with reference to FIG. 13.

Figure 13:
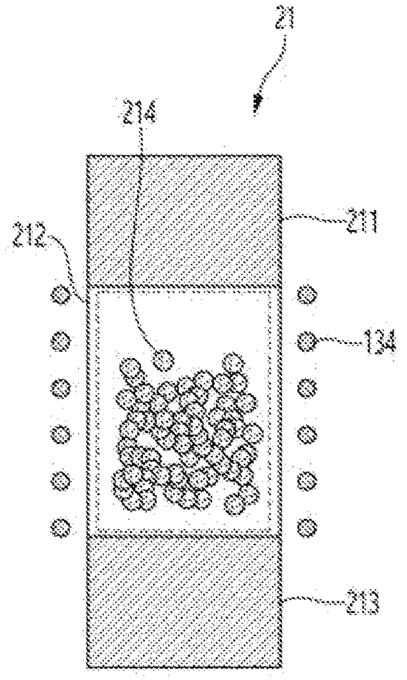
FIG. 13 is an exemplary view for describing a heating structure of a heater part according to a fifth embodiment of the present disclosure.

As illustrated in FIG. 13, the heater part 13 according to the present embodiment may use a particulate susceptor material (hereinafter referred to as "susceptor particles") to heat the cavity segment 212 by an induction heating method. Specifically, the heater part 13 may be configured to include an inductor 134 (e.g., an induction coil) for inductively heating a susceptor material, and a plurality of susceptor particles may be disposed inside the cavity segment 212. In this case, since the tobacco granules 214 are heated as the plurality of susceptor particles are mixed with the tobacco granules 214 inside the cavity segment 212, the tobacco granules 214 can be uniformly heated.

The susceptor particles may be disposed in various ways. For example, the susceptor particles may be filled in the cavity segment 212 together with the tobacco granules 214. As another example, the susceptor particles may constitute a portion of the tobacco granules 214. For instance, by adding the susceptor particles when producing the tobacco granules 214, tobacco granules 214 including the susceptor particles may be produced.

The heating structures of the heater part 13 according to the first to fifth embodiments of the present disclosure have been described above with reference to FIGS. 9 to 13. The embodiments have been separately described in order to provide convenience of understanding, but the above-described first to fifth embodiments may be combined in various forms. For example, the heater part 13 according to some embodiments may be configured to include an internal heating element and an external heating element which is configured to heat only the cavity segment 212.

Hereinafter, the configurations and effects of the tobacco granules 214 and/or the aerosol-generating article 2 will be described in more detail using examples and experimental examples. However, the following examples are only some examples of the present disclosure, and the scope of the present disclosure is not limited by the following examples.

Example 1

A cigarette having a structure identical to the structure of the aerosol-generating article 2 illustrated in FIG. 7 was manufactured. Specifically, a cigarette having a circumference of about 22 mm and a length of about 48 mm was manufactured, and about 150 mg of tobacco granules were added to a cavity segment of a tobacco rod. Also, crepe paper (that is, paper subjected to a crimping process) having a paper width of about 150 mm was added to manufacture a paper filter having a resistance to draw of about 70 $mmH_2O/60$ mm (refer to Table 1 below), and the manufactured paper filter was cut to be used as a filter segment of the tobacco rod. Also, a paper tube was used as a cooling segment of a filter rod, and a cellulose acetate filter was used as a mouthpiece segment.

Example 2

A cigarette identical to that of Example 1 was manufactured except that paper having a paper width of about 150 mm was added to manufacture a paper filter having a resistance to draw of about 70 $mmH_2O/60$ mm (refer to Table 1 below) and the manufactured paper filter was cut to be used as a filter segment of the tobacco rod. In order to decrease the resistance to draw as compared to Example 1, crepe paper having a lower crimping strength as compared to Example 1 was added to manufacture the paper filter.

Example 3

A cigarette identical to that of Example 1 was manufactured except that paper having a paper width of about 120 mm was added to manufacture a paper filter having a resistance to draw of about 70 $mmH_2O/60$ mm (refer to Table 1 below) and the manufactured paper filter was cut to be used as a filter segment of the tobacco rod. In order to make the resistance to draw equal to that in Example 1, crepe paper having a higher crimping strength as compared to Example 1 was added to manufacture the paper filter.

Example 4

A cigarette identical to that of Example 1 was manufactured except that paper having a paper width of about 120 mm was added to manufacture a paper filter having a resistance to draw of about 50 $mmH_2O/60$ mm (refer to Table 1 below) and the manufactured paper filter was cut to be used as a filter segment of the tobacco rod. In order to make the resistance to draw equal to that in Example 2, crepe paper having a higher crimping strength as compared to Example 2 was added to manufacture the paper filter.

Example 5

A cigarette identical to that of Example 1 was manufactured except that paper having a paper width of about 120 mm was added to manufacture a paper filter having a resistance to draw of about 100 $mmH_2O/60$ mm (refer to Table 1 below) and the manufactured paper filter was cut to be used as a filter segment of the tobacco rod. In order to increase the resistance to draw as compared to Example 3, crepe paper having a higher crimping strength as compared to Example 3 was added to manufacture the paper filter.

The specifications of the paper filters used in manufacturing the cigarettes according to Examples 1 to 5 are summarized in Table 1 below, and the structures and specifications of the cigarettes according to Examples 1 to 5 are summarized in Table 2.

TABLE 1

| Classification | Circumference (mm) | Resistance to draw ($mmH_2O$) | Paper width (mm) | Filter base paper | Filter wrapping paper | Length (mm) |
|---|---|---|---|---|---|---|
| Example 1 | 22 | 70 | 150 | Crepe paper | MFW | 60 |
| Example 2 | | 50 | | | | |
| Example 3 | | 70 | 120 | | | |
| Example 4 | | 50 | | | | |
| Example 5 | | 100 | 120 | | | |

TABLE 2

| | Tobacco rod | | | Filter rod | |
|---|---|---|---|---|---|
| | Filter segment | | Cavity | Cooling | Mouthpiece |
| Classification | Upstream | Downstream | segment | segment | segment |
| Example 1 | Paper (150 mm, 70 $mmH_2O/60$ mm) | | Granules | Paper | Acetate |
| Example 2 | Paper (150 mm, 50 $mmH_2O/60$ mm) | | 150 mg | tube | filter |
| Example 3 | Paper (120 mm, 70 $mmH_2O/60$ mm) | | | | |
| Example 4 | Paper (120 mm, 50 $mmH_2O/60$ mm) | | | | |
| Example 5 | Paper (120 mm, 100 $mmH_2O/60$ mm) | | | | |

Experimental Example 1: Evaluation of Vapor Production

An experiment was conducted to evaluate vapor production of the cigarettes according to Examples 1 to 5. Specifically, in order to evaluate the extent to which the paper materials added to the filter segments of the cigarettes affect the vapor production, an experiment was conducted to measure an increase in the weight of the paper material after smoking (that is, an increase in the weight due to the paper material absorbing moisture from an aerosol or the like generated from a liquid cartridge) and analyze components of smoke. Also, the actual amount of vapor production visible to the naked eye (that is, visible vapor production) during smoking was relatively evaluated. The experiment was conducted using a hybrid-type aerosol generation device (refer to FIG. 2 or 3) having the liquid cartridge mounted thereon in a smoking room with a temperature of about 20° C. and humidity of about 62.5%, and the smoke for component analysis was repeatedly collected three times for each sample, based on eight puffs per time. Average values of three collection results are shown in Table 3 below. An increase in the weight of the filter segments shown in Table 3 was also calculated using average values of three measurement results.

TABLE 3

| Classification | TPM (mg/cig.) | Increase in weight of filter segment disposed upstream (mg) | Increase in weight of filter segment disposed downstream (mg) | Visible vapor production |
|---|---|---|---|---|
| Example 1 | 50.7 | 38.5 | 11.2 | Slightly high |
| Example 2 | 46.1 | 28.8 | 12.2 | High |
| Example 3 | 39.1 | 36.4 | 15.9 | Moderate |
| Example 4 | 43.2 | 29.5 | 15.8 | Slightly high |
| Example 5 | 32.1 | 41.5 | 16.2 | Slightly low |

Referring to Table 3 above, the vapor production of the cigarette according to Example 2 was found to be generally superior to Example 1. Specifically, the increase in the weight of the filter segments according to Example 2 was found to be less (that is, the amount of moisture absorbed by the paper material was found to be less) as compared to Example 1, and the visible vapor production was also found to be superior in the cigarette according to Example 2 than in the cigarette according to Example 1. This is determined to be due to adding the paper material with a relatively lower crimping strength in order to decrease the resistance to draw as compared to Example 1. Also, vapor production of the cigarette according to Example 5 was evaluated to be the lowest (that is, visible vapor production was relatively low and an increase in the weight of the filter segments was high), and this is also determined to be for the same reason as above. In other words, during manufacture of the filter segments according to Example 5, paper with a relatively small paper width and an extremely high crimping strength was used for the resistance to draw to be about 100 $mmH_2O$/60 mm, and this is determined to have affected the vapor production.

Also, comparing Example 1 and Example 3 (or Example 2 and Example 4), the vapor production of the cigarette according to Example 1 was found to be superior. This is determined to indicate that the crimping strength of the paper added to the filter segments has a greater influence on the vapor production than the paper width of the paper. In other words, this is determined to indicate that, even when the paper width of the paper added to the filter segments is large (that is, the amount of added paper is large), the influence of the paper width on the vapor production can be adjusted by decreasing the crimping strength.

For reference, although not described above, paper with a very low crimping strength was used to manufacture a paper filter having a resistance to draw of about 30 $mmH_2O$/60 mm, and the manufactured paper filter was cut to manufacture a cigarette, and during the manufacture, fall-off of tobacco granules occurred intermittently. Therefore, the manufactured cigarette was excluded when conducting the vapor production evaluation experiment according to Experimental Example 1.

In summary, it can be seen that, for the filter segments of the tobacco rod, moderately crimped paper may be used to manufacture a paper filter having a resistance to draw in a range of about 50 $mmH_2O$/60 mm to 100 $mmH_2O$/60 mm, and it can be seen that the paper width does not have a great influence on the vapor production even when the paper width is further increased beyond the range of about 120 mm to 150 mm.

Example 6

Tobacco granules having a size in a range of about 30 mesh to 45 mesh were produced, and the produced tobacco granules were added with a filling rate of about 75 vol % to manufacture a cigarette having a structure identical to the structure of the article 2 illustrated in FIG. 7. As two filter segments (e.g., 211 and 213) constituting the tobacco rod (e.g., 21), filters made of a paper material having grease resistance (grease resistance measured according to a 3 M Kit Test) of about 2 were used.

Example 7

A cigarette identical to that of Example 6 was manufactured except that filters made of a paper material having grease resistance of about 6 were used.

Example 8

A cigarette identical to that of Example 6 was manufactured except that tobacco granules had a size in a range of about 20 mesh to 30 mesh.

Example 9

A cigarette identical to that of Example 6 was manufactured except that tobacco granules were added with a filling rate of about 50 vol %.

Example 10

A cigarette identical to that of Example 6 was manufactured except that tobacco granules were added with a filling rate of about 100 vol %.

Experimental Example 2: Confirmation of Influence of Grease Resistance of Paper Material on Vapor Production In order to confirm an influence of grease resistance of a paper material added to the filter segments (e.g., 211 and 213) on vapor production, an experiment was conducted to analyze components of smoke of the cigarettes according to Examples 6 and 7 and measure total particulate matter (TPM) content in a smoking mode. The experiment was conducted in the same manner as in Experimental Example 1, and the experimental results are shown in Table 4 below.

TABLE 4

| Classification | TPM (mg/cigar) |
|---|---|
| Example 6 | 37.23 |
| Example 7 | 44.40 |

Referring to Table 4, the TPM content in the cigarette according to Example 7 (that is, the cigarette to which the paper material with higher grease resistance was added) was found to be significantly higher as compared to Example 6. This is determined to be due to the paper material with higher grease resistance not absorbing as much moisture from an aerosol passing through the filter segments, thus increasing the amount of an aerosol-forming agent and moisture being transferred. From such experimental results, it can be seen that the vapor production can be increased when the paper material with high grease resistance is added.

Figure 14:
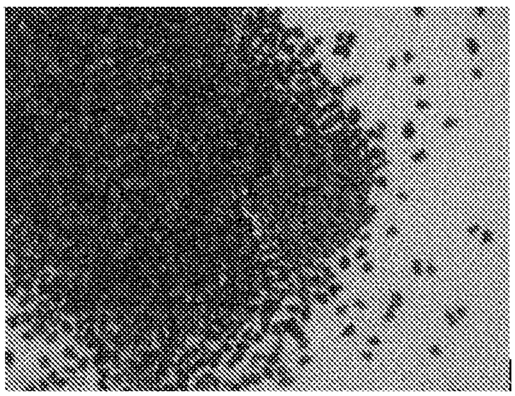
FIGS. 14 and 15 are views showing experimental results on an influence of a size of tobacco granules on generation of a vortex.
Figure 15:
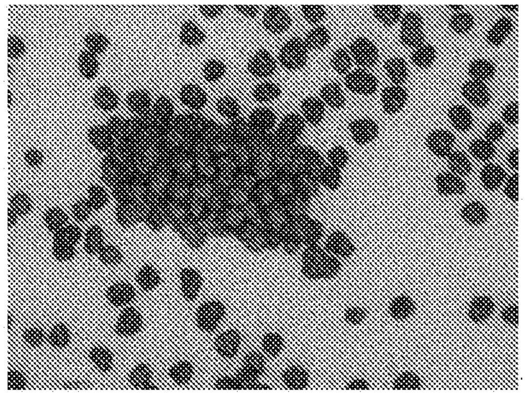

Experimental Example 3: Confirmation of Influence of Size of Tobacco Granules on Vortex Generation In order to confirm an influence of the size of tobacco granules on generation of a vortex inside a cavity segment (e.g., 212), a smoking experiment was conducted using the cigarettes according to Examples 6 and 8, and an experiment was conducted to check a degree to which the tobacco granules were agglomerated after smoking. This is because the more the vortex is generated inside the cavity segment (e.g., 212), the more evenly the tobacco granules are mixed, reducing agglomeration thereof, and thus the degree of agglomeration of the tobacco granules after smoking can be a measure of the degree of vortex generation. The experimental results are shown in FIGS. 14 and 15. FIGS. 14 and 15 are pictures of the degree of agglomeration of the tobacco granules after smoking and show experimental results relating to Example 6 (in which the tobacco granules have a size in a range of about 30 mesh to 45 mesh) and Example 8 (in which the tobacco granules have a size in a range of about 20 mesh to 30 mesh), respectively.

Referring to FIGS. 14 and 15, it was found that the tobacco granules according to Example 8 (that is, the tobacco granules having a larger size) were agglomerated more than the tobacco granules according to Example 6. That is, it was confirmed that, while the tobacco granules according to Example 6 were relatively evenly spread, some of the tobacco granules according to Example 8 were strongly agglomerated. This is determined to be due to the tobacco granules having a larger size acting as stronger resistance to the entering airflow (e.g., due to an increase in the weight, size, or the like of the tobacco granules, the airflow can be blocked better), thus decreasing the probability of vortex generation.

Figure 16:
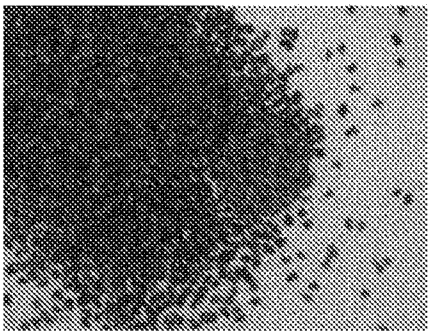
FIGS. 16 to 18 are views showing experimental results on an influence of a filling rate of tobacco granules on generation of a vortex.
Figure 17:
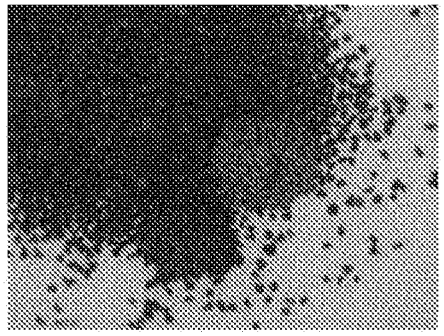
Figure 18:

Experimental Example 4: Confirmation of Influence of Filling Rate of Tobacco Granules on Vortex Generation In order to confirm an influence of the filling rate of tobacco granules on generation of a vortex inside the cavity segment (e.g., 212), a smoking experiment was conducted using the cigarettes according to Examples 6, 9, and 10, and an experiment was conducted to check a degree to which the tobacco granules were agglomerated after smoking. The experimental results are shown in FIGS. 16 to 18. FIGS. 16, 17, and 18 are pictures of the degree of agglomeration of the tobacco granules after smoking and show experimental results relating to Example 9 (in which the tobacco granules were added with a filling rate of about 50 vol %), Example 6 (in which the tobacco granules were added with a filling rate of about 75 vol %), and Example 10 (in which the tobacco granules were added with a filling rate of about 100 vol %), respectively.

Referring to FIGS. 16 to 18, it was found that the higher the filling rate of the tobacco granules, the higher the degree of agglomeration of the tobacco granules. For example, the degree of agglomeration of the tobacco granules according to Example 9 that were added with a filling rate of about 50 vol % was found to be significantly lower than the degree of agglomeration of the tobacco granules according to Example 10 that were added with a filling rate of about 100 vol %. This is determined to be due to an empty space in the cavity segment (e.g., 212) increasing and an airflow being promoted with a decrease in the filling rate, and the probability of vortex generation increasing as the airflow is promoted. From such experimental results, it can be seen that the tobacco granules may be added with a filling rate of about 75 vol % or lower or about 80 vol % or lower.

Figure 19:
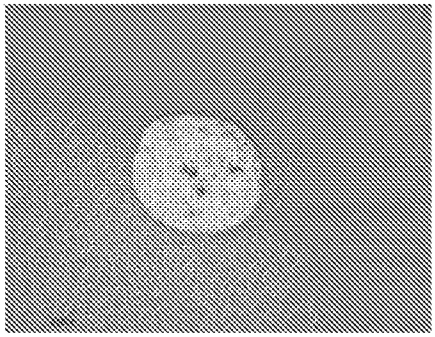
FIGS. 19 to 21 are views showing experimental results on an influence of a thickness and shape of an internal heating element on a degree of damage to a filter segment.
Figure 20:
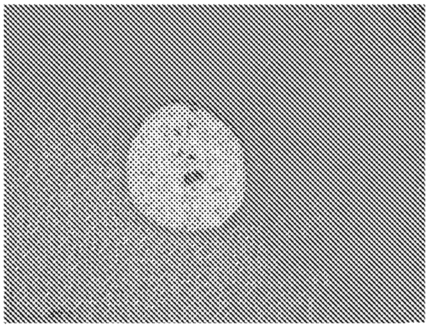
Figure 21:
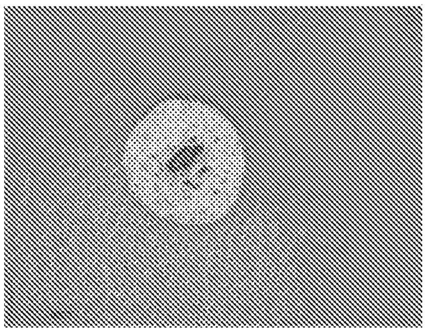

Experimental Example 5: Confirmation of Influence of Thickness and Shape of Heating Element on Degree of Damage to Filter Segment Since the fall-off of tobacco granules may be accelerated with an increase in the degree of damage to filter segments, an experiment was conducted to confirm an influence of the thickness and shape of an internal heating element (e.g., 132) on the degree of damage to a filter segment (e.g., 213). Specifically, an experiment was conducted by checking the degree of damage to the filter segment of the cigarette according to Example 6 while varying the thickness and shape of the internal heating element. The experimental results are shown in FIGS. 19 to 21. FIGS. 19 to 21 are pictures of cross-sections of the filter segment (e.g., 213) penetrated by the internal heating element and show experimental results relating to a semi-conical heating element having a thickness of about 2 mm, a cylindrical (bar-shaped) heating element having a thickness of about 2 mm, and a cylindrical heating element having a thickness of about 3 mm, respectively.

Referring to FIGS. 19 to 21, it can be seen that the thicker the thickness of the heating element, the higher the degree of damage to the filter segment. From this, it can be seen that the heating element may have a thickness less than or equal to about 3 mm in order to minimize damage to the filter segment and the fall-off of the tobacco granules.

Also, it can be seen that a heating element having a sharp shape such as a semi-conical shape, rather than a heating element having a cylindrical shape, may be used in order to minimize damage to the filter segment.

For reference, it was confirmed that, when the thickness of the heating element was about 4 mm or more, the filter segment was pushed upon insertion of the heating element, making it difficult to insert the heating element, and the degree of damage to the filter segment further increased.

The configurations and effects of the tobacco granules 214 and/or the aerosol-generating article 2 have been described in more detail above using the examples and experimental examples.

The embodiments of the present disclosure have been described above with reference to the accompanying drawings, but those of ordinary skill in the art to which the present disclosure pertains should understand that the present disclosure may be embodied in other specific forms without changing the technical spirit or essential features thereof. Therefore, the embodiments described above should be understood as being illustrative, instead of limiting, in all aspects. The scope of the present disclosure should be interpreted according to the claims below, and any technical spirit within the scope equivalent to the claims should be interpreted as falling within the scope of the technical spirit defined by the present disclosure.

The invention claimed is:

1. An aerosol generation device comprising:

a housing configured to form an accommodation space in which an aerosol-generating article is accommodated;

a heater part configured to heat the aerosol-generating article accommodated in the accommodation space, wherein the heater part includes an external heating element configured to heat the aerosol-generating article from outside and an internal heating element configured to heat the aerosol-generating article from inside, wherein the aerosol-generating article includes a tobacco rod, which is filled with tobacco granules, and a filter rod, wherein the tobacco rod includes a first filter segment, a second filter segment, and a cavity segment formed by the first filter segment and the second filter segment, wherein the tobacco granules are filled in the cavity segment, and wherein the external heating element includes a first external heating element configured to heat an upstream portion of the cavity segment and a second external heating element configured to heat a downstream portion of the cavity segment.

2. The aerosol generation device of claim 1, wherein:

the second filter segment is disposed upstream of the cavity segment and includes a paper material; and a thickness of the internal heating element is 2.0 mm or less.

3. The aerosol generation device of claim 1, wherein:

the heater part includes a heating element configured to heat the tobacco rod from an outside; and the external heating element is disposed to heat only the cavity segment.

4. The aerosol generation device of claim 1, wherein:

a filling rate of the tobacco granules in the cavity segment is 80 vol % or lower;

a density of the tobacco granules is in a range of 0.5 $g/cm^3$ to 1.2 $g/cm^3$;

a diameter of the tobacco granules is in a range of 0.3 mm to 1.2 mm; and resistance to draw of the first filter segment, which is disposed downstream of the cavity segment, is in a range of 50 $mmH_2O/60$ mm to 150 $mmH_2O/60$ mm.

5. The aerosol generation device of claim 1, wherein:

the first filter segment includes a paper material whose paper width is in a range of 100 mm to 200 mm; and resistance to draw of the first filter segment is in a range of 50 $mmH_2O/60$ mm to 100 $mmH_2O/60$ mm.

6. The aerosol generation device of claim 1, wherein a heat conduction element configured to transfer heat generated from the external heating element to an inside of the tobacco rod.

7. The aerosol generation device of claim 1, wherein:

the tobacco granules or the tobacco rod include a particulate susceptor material; and the heater part includes an inductor configured to inductively heat the particulate susceptor material.

8. The aerosol generation device of claim 1, wherein the filter rod includes a cooling segment and a mouthpiece segment.

9. The aerosol generation device of claim 1, wherein the second external heating element is disposed to form an unheated portion in a vicinity of a downstream end of the cavity segment.

10. The aerosol generation device of claim 1, wherein the first external heating element and the second external heating element operate at different heating temperatures.

11. The aerosol generation device of claim 1, further comprising a third external heating element configured to heat a region within the cavity segment that is not heated by the first external heating element and the second external heating element.

12. The aerosol generation device of claim 1, wherein the external heating element and the internal heating element operate at different temperatures.

* * * * *